(12) United States Patent
Ofek et al.

(10) Patent No.: US 11,544,383 B2
(45) Date of Patent: Jan. 3, 2023

(54) METHOD FOR RUNTIME MITIGATION OF SOFTWARE AND FIRMWARE CODE WEAKNESSES

(71) Applicant: Red Bend Ltd., Hod Hasharon (IL)

(72) Inventors: David Mor Ofek, Nes Harim (IL); Yuval Weisglass, Kfar Sava (IL)

(73) Assignee: Red Bend Ltd., Hod Hasharon (IL)

( * ) Notice: Subject to any disclaimer, the term of this patent is extended or adjusted under 35 U.S.C. 154(b) by 733 days.

(21) Appl. No.: 16/368,113

(22) Filed: Mar. 28, 2019

(65) Prior Publication Data

US 2019/0303585 A1 Oct. 3, 2019

Related U.S. Application Data

(60) Provisional application No. 62/649,989, filed on Mar. 29, 2018.

(51) Int. Cl.
*G06F 21/00* (2013.01)
*G06F 21/57* (2013.01)
*G06F 8/656* (2018.01)
*G06F 8/75* (2018.01)
*G06F 21/54* (2013.01)
(Continued)

(52) U.S. Cl.
CPC ............ *G06F 21/577* (2013.01); *G06F 8/656* (2018.02); *G06F 8/75* (2013.01); *G06F 21/54* (2013.01); *G06F 21/55* (2013.01); *G06F 21/554* (2013.01); *G06F 9/44505* (2013.01); *G06F 11/0793* (2013.01); *G06F 2221/033* (2013.01)

(58) Field of Classification Search
CPC .......... G06F 21/577; G06F 8/656; G06F 8/75; G06F 21/54; G06F 21/55; G06F 21/554; G06F 9/44505; G06F 11/0793; G06F 2221/033; G06F 21/50; H04L 63/14
USPC .......................................................... 726/25
See application file for complete search history.

(56) References Cited

U.S. PATENT DOCUMENTS 7,467,198 B2 * 12/2008 Goodman .............. G06Q 10/06
709/227
8,997,086 B2 * 3/2015 Deckert .................... G06F 8/65
717/172

(Continued)

OTHER PUBLICATIONS

European Search Report and the European Search Opinion dated Sep. 3, 2019 From the European Patent Office Re. Application No. 19165996.0. (11 Pages).

(Continued)

*Primary Examiner* — Josnel Jeudy
(74) *Attorney, Agent, or Firm* — McCoy Russell LLP

(57) ABSTRACT

A system of mitigating code weaknesses in a target code by adding micro functionality fixes. The system includes a mitigation module installed a memory chip of a device and a server for identifying a plurality of code weaknesses in a target code installed in a memory chip of a device and sending configuration instructions to the mitigation module, the configuration instructions comprising: a plurality of micro functionality fixes, and a plurality of code weakness locations each associated with one of the plurality of code weaknesses and one of the plurality of micro functionality fixes. The execution of the mitigation module by at least one processor of the device induces an installment of the plurality of micro functionality fixes in the plurality of code weakness locations.

15 Claims, 4 Drawing Sheets

(51) Int. Cl.
  *G06F 21/55* (2013.01)
  *G06F 9/445* (2018.01)
  *G06F 11/07* (2006.01)

(56) References Cited

U.S. PATENT DOCUMENTS

| | | | | |
|---|---|---|---|---|
| 9,760,362 | B2* | 9/2017 | Anderson | G06F 8/65 |
| 10,547,631 | B1* | 1/2020 | Oliphant | H04L 63/1416 |
| 2003/0084229 | A1* | 5/2003 | Ho | G06F 9/268 |
| | | | | 711/102 |
| 2005/0257208 | A1* | 11/2005 | Blumfield | G06F 8/71 |
| | | | | 717/168 |
| 2008/0178167 | A1* | 7/2008 | Sriram | G06F 8/658 |
| | | | | 717/169 |
| 2010/0153781 | A1* | 6/2010 | Hanna | H04L 67/02 |
| | | | | 714/37 |
| 2011/0041179 | A1* | 2/2011 | St Hlberg | G06F 21/566 |
| | | | | 726/23 |
| 2011/0099375 | A1* | 4/2011 | Hammes | G06F 21/577 |
| | | | | 713/168 |
| 2018/0212937 | A1* | 7/2018 | Wang | H04L 12/40 |
| 2018/0247069 | A1* | 8/2018 | Tang | G06F 12/1475 |
| 2018/0308808 | A1* | 10/2018 | Kirschner | G06F 30/394 |
| 2020/0074084 | A1* | 3/2020 | Dorrans | G06F 21/577 |

OTHER PUBLICATIONS

Bertolino et al. "A Tour of Secure Software Engineering Solutions for Connected Vehicles", Software Quality Journal, XP036625566, 26(4): 1223-1256, Published Online Nov. 21, 2017.

Cornelio et al. "Development of Intrusion Detection System for Vehicle CAN Bus Cyber Security", 14th Workshop Automotive SPIN Italia, XP055614614, Milan, Italy, Nov. 10, 2016, p. 1-22, Nov. 10, 2016.

Edwards et al. "Evaluation of Software Vulnerabilities in Vehicle Electronic Control Units", 2017 IEEE Cybersecurity Development, SecDev, XP033234598, Cambridge, MA, USA, Sep. 24-26, 2017, p. 83-84, Sep. 24, 2017.

Lautenbach et al. "What the Stack? On Memory Exploitation and Protection in Resource Constrained Automotive Systems", International Conference on Critical Information Infrastructures Security, CRITIS 2017: Critical Information Infrastructures Security, XP055614602, LNCS 10707: 185-193, Oct. 8, 2017.

Shahriar et al. "Mitigating Program Security Vulnerabilities: Approaches and Challenges", ACM Computing Surveys, XP055614938, 44(3/Art. 11): 1-46, Jun. 2012.

Wu et al. "They Know Your Weakness—Do You?: Reintroducing Common Weakness Enumeration", CrossTalk—Supply Chain Assurance, XP055613777, p. 44-50, Sep./Oct. 2015.

* cited by examiner

METHOD FOR RUNTIME MITIGATION OF SOFTWARE AND FIRMWARE CODE WEAKNESSES

RELATED APPLICATION

This application claims the benefit of priority of U.S. Provisional Patent Application No. 62/649,989 filed on Mar. 29, 2018, the contents of which are incorporated herein by reference in their entirety.

BACKGROUND

At least some embodiments of systems, methods, apparatus, and/or code instructions described herein, relate to code weakness mitigation and, more specifically, but not exclusively, to mitigation of firmware and/or software weaknesses and software vulnerabilities.

A weakness may be a vulnerability, which is a mistake in software code that provides an attacker with direct access to a system or network. It could allow an attacker to pose as a super-user or system administrator with full access privileges.

A weakness may be an exposure, which is a mistake is code that gives an attacker indirect access to a system or network. It could allow an attacker to gather customer information that could be sold.

Systems and methods are being developed for mitigation of firmware and/or software based on detection of known vulnerabilities and/or weaknesses.

SUMMARY

According to a first aspect, a method of mitigating code weaknesses in a target code by adding micro functionality fixes, comprises: at least one server external to a device, executing a code for: identifying a plurality of code weaknesses in a target code installed in a memory chip of a device, and sending configuration instructions to a mitigation module installed on the memory chip, the configuration instructions comprising: a plurality of micro functionality fixes, and a plurality of code weakness locations each associated with one of the plurality of code weaknesses and one of the plurality of micro functionality fixes, wherein an execution of the mitigation module by at least one processor of the device induces an installment of the plurality of micro functionality fixes in the plurality of code weakness locations.

According to a second aspect, a system of mitigating code weaknesses in a target code by adding micro functionality fixes, comprises: a mitigation module installed a memory chip of a device, at least one server external to the device for identifying a plurality of code weaknesses a target code installed in a memory chip of a device to and sending configuration instructions to the mitigation module, the configuration instructions comprising: a plurality of micro functionality fixes, and a plurality of code weakness locations each associated with one of the plurality of code weaknesses and one of the plurality of micro functionality fixes, wherein the execution of the mitigation module by at least one processor of the device induces an installment of the plurality of micro functionality fixes in the plurality of code weakness locations.

According to a third aspect, a computer program product for of mitigating code weaknesses in a target code by adding micro functionality fixes, comprises: a non-transitory memory storing thereon code for execution by at least one hardware process, the code including instructions for: identifying a plurality of code weaknesses in a target code installed in a memory chip of a device, and sending configuration instructions to a mitigation module installed on the memory chip, the configuration instructions comprising: a plurality of micro functionality fixes, and a plurality of code weakness locations each associated with one of the plurality of code weaknesses and one of the plurality of micro functionality fixes, wherein an execution of the mitigation module by at least one processor of the device induces an installment of the plurality of micro functionality fixes in the plurality of code weakness locations.

In a further implementation of the first, second, and third aspect, the plurality of code weaknesses are selected from a group consisting of common vulnerability exposures (CVEs) and common weakness enumerations (CWEs).

In a further implementation of the first, second, and third aspect, the plurality of code weaknesses are automatically detected by a static analysis tool.

In a further implementation of the first, second, and third aspect, further comprising receiving an update to the static analysis tool for detecting at least one new code weakness, and iterating the identifying to detect the at least one new code weakness, and the sending configuration instructions comprising at least one new micro functionality fix and at least one new code weakness location for associated at least one new code weakness, wherein the execution of the mitigation module induces another installment of the at least one new micro functionality fix in the at least one new code weakness locations.

In a further implementation of the first, second, and third aspect, the target code is a portion of a full image, wherein the target code is executed as part of the full image and not executed independently.

In a further implementation of the first, second, and third aspect, the configuration instructions comprises a plurality of policies each comprising at least one code statement for activating one of the plurality of micro functionality fixes, wherein the execution of the mitigation module by the at least one processor of the device induces the installment of the plurality of policies in the target code.

In a further implementation of the first, second, and third aspect, the at least one code statement is a conditional statement reactive to a signal received from an intrusion detection system (IDS).

In a further implementation of the first, second, and third aspect, the conditional statement changes a state of one of the plurality of micro functionality fixes to an active state from a non active state when the signal from the ids is received.

In a further implementation of the first, second, and third aspect, the ids generates the signal in response to a detected active attack on the device.

In a further implementation of the first, second, and third aspect, two or more micro functionality fixes are installed for a single code weakness location, and a policy defines conditions for selectively activation each one of the two or more micro functionality fixes.

In a further implementation of the first, second, and third aspect, the plurality of micro functionality fixes are installed as software hooks in the plurality of code weakness locations.

In a further implementation of the first, second, and third aspect, each micro functionality fix is 2-6 code lines.

In a further implementation of the first, second, and third aspect, each micro functionality fix sets a function to be left unexecuted or semi executed so as to avoid performing one of the detected code weaknesses.

In a further implementation of the first, second, and third aspect, the execution of the mitigation module induces the installment of the plurality of micro functionality fixes in the plurality of code weakness locations in a running memory of the memory chip.

In a further implementation of the first, second, and third aspect, the device is a component installed in a vehicle.

Unless otherwise defined, all technical and/or scientific terms used herein have the same meaning as commonly understood by one of ordinary skill in the art to which at least some embodiments pertain. Although methods and materials similar or equivalent to those described herein can be used in the practice or testing of embodiments described herein, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of some embodiments. In this regard, the description taken with the drawings makes apparent to those skilled in the art how some embodiments may be practiced.

In the drawings.

DETAILED DESCRIPTION

Figure 1:
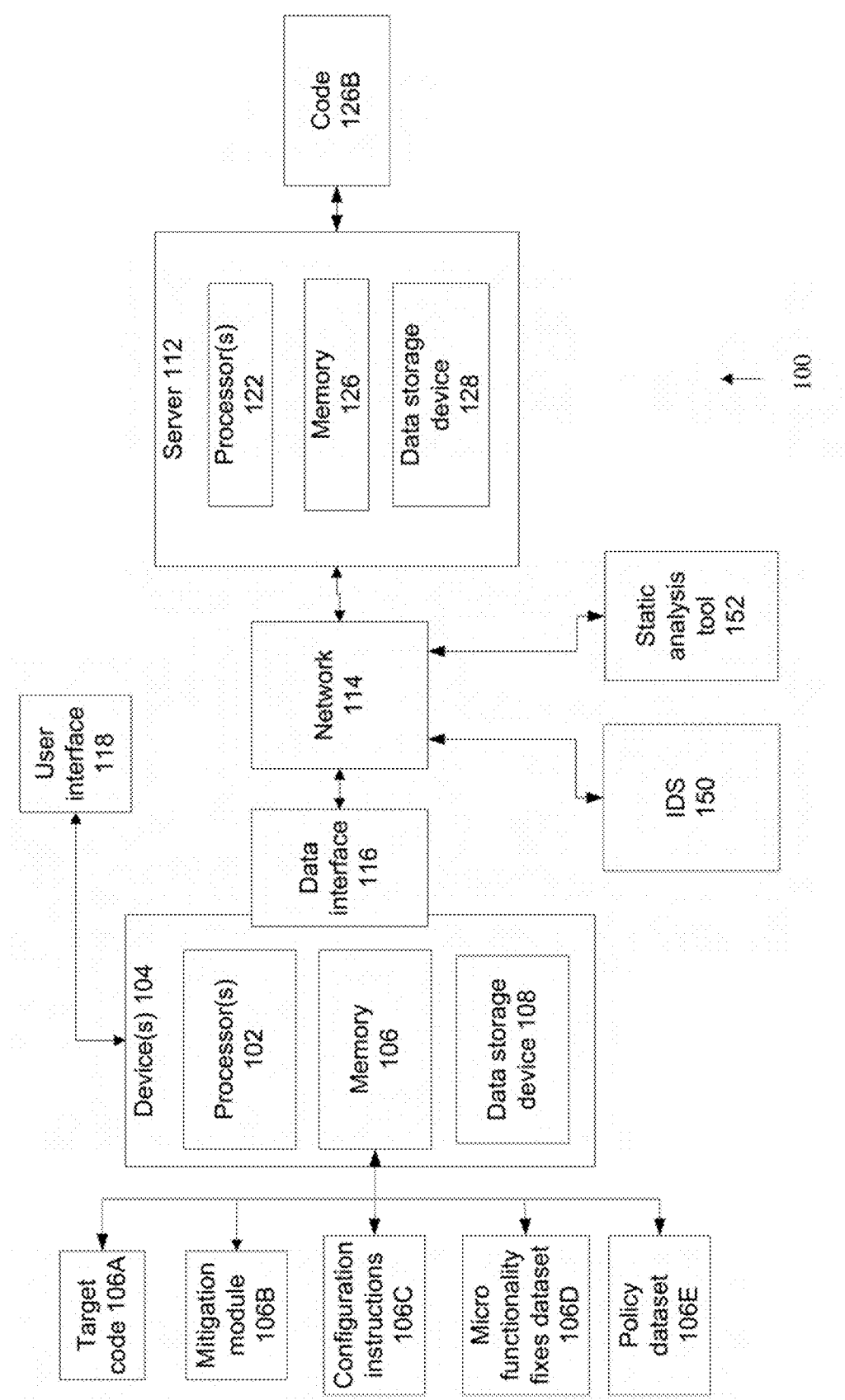
FIG. 1 is a block diagram of components of a system for mitigating code weaknesses in a target code by adding micro functionality fixes, in accordance with some embodiments.

An aspect of some embodiments relates to systems, methods, an apparatus, and/or code instructions for mitigating code weakness in a target code installed in a memory chip of a device, by adding micro functionality fixes. Multiple code weaknesses in the target code are identified, for example, by static analysis tools. Exemplary code weaknesses include common vulnerability exposures (CVEs) and common weakness enumerations (CWEs). Configuration instructions are automatically crated and provided to a mitigation module installed on the memory chip. The configuration instructions include multiple micro functionality fixes and associated locations of the identified code weaknesses. Execution of the mitigation module by the processor (s) of the device induces installment of the micro functionality fixes in the locations of the identified code weaknesses. Conceptually, the micro functionality fixes provide targeted fixes per identified code weaknesses, while the target code remain unaffected, enabling fixing the code weaknesses without fixing the image of the target code directly.

Optionally, the configuration instructions include multiple policies. Each policy includes code statement(s) for activating one of the micro functionality fixes. Optionally, the code statement(s) is a conditional statement reactive to a signal received from an intrusion detection system (IDS), for example, generated in response to a detected active attack on the device by the IDS. The execution of the mitigation module by the processor of the device induces the installment of the policies in the target code. In this manner, the micro functionality fixes may be selective activated and executed in response to an attack (or other condition), rather than as default, for example, when the fix may be a block of a weakness in an important code function the block may be only activated during the attack and let to run when no attack occurs.

As used herein, the term device may sometimes be interchanged with the term computing device.

As used herein, the term device may sometimes be interchanged with the term protected device.

At least some implementations of the systems, methods, apparatus, and/or code instructions described herein improve the technology of cybersecurity, in particular, providing security of a device.

At least some implementations of the systems, methods, apparatus, and/or code instructions described herein improve the operation of a device, by reducing or preventing improper execution of a target code of the device, for example, preventing or reducing risk of: a crash of the device, increased processor utilization, increased use of storage space of a memory, and/or inaccuracy in outputted results; due to errors in target code.

At least some implementations of the systems, methods, apparatus, and/or code instructions described herein provide improvements over standard processors for detection of known software failures, such as common vulnerability exposure (CVE) and/or common weakness enumeration (CWE) in software and firmware. Detection of weaknesses in code may b e commonly done by a variety of static code analysis tools in various high-level and low level programming languages and/or by an analysis of a binary code residing in a code storage such as a memory chip and/or any other integrated circuit. The standard process of mitigating CVEs and CWEs in a target code involves detecting CVEs and/or CWEs, identifying code corrections for fixing the target code and/or suggestions for security patches given to developers of related third party code, rebuilding and installing a respective binary code with the code corrections and/or security patches in a protected device (e.g. a device tested for mitigating code weaknesses), downloading and executing a test on the protected device for testing a fixed binary code incorporating code corrections and/or security patches, and distributing an operational version of the corrected code to devices, for instance electronic control units of vehicles.

At least some implementations of the systems, methods, apparatus, and/or code instructions described herein improve upon the standard processes. For example, first, the logistic operation of the standard process is usually long and costly, in comparison to computationally efficient logistic operation provided by at least some implementations of the systems, methods, apparatus, and/or code instructions described herein. Second, as the tested software and/or firmware includes a proprietary code and a third party code, the integrity of the tested software and/or firmware depends on actual implementation of security patches by the third party with no control of the time it takes them. In contrast, at least some implementations of the systems, methods, apparatus, and/or code instructions described herein are independent of the propriety and/or third party code, and/or independent of third parties.

At least some implementations of the systems, methods, apparatus, and/or code instructions described herein provide advantages over the standard mitigation flows. For example:

In some embodiments, the micro functionality fixes are only triggered according to a policy, optionally a signal from an IDS, for example, when the IDS detects an active attack on the device. Since the micro functionality fixes are selectively triggered, the target code itself may be executed the majority of the time, with the micro functionality fixes only used when the condition is met, for example, as added protection against an attack. When there no attack is detected, the original target code may be executed. Some advantages for executing the original code most of the time and only activating the fixes during an attack include: the fixes may be more computationally intensive and therefore should only be used when needed, the fixes may block or disable important functions in the target code (e.g., when fixing the weakness is not possible or practical) and therefore should only be executed during an attack as a protection mechanism. When there is no attack the function (which is a code weakness) may be required to execute to perform the important function.

In some embodiments there is no need for full image download process. When no full image download is needed, updates can be done faster and with less communication requirements. Computational efficiency of the device and/or network may be improved. Cybersecurity of the device may be improved, since the time during which the device may be exposed to malicious attack and/or prone to crash (or other malfunction) may be reduced by the faster turnaround time of obtaining a fix as described herein, in comparison to standard processes which require a long time to obtain the updated full image during which the device may be exposed. Alternatively, operation of the device may be improved, since the downtime of the device during the exposure window may be reduced.

Partial development of the target code can be implied gradually before the full image is prepared, which may provide, for example, for operation of the device using the existing target code and available mitigation without having to wait for the full update of the full image as required by the standard process. Cybersecurity of the device may be improved by the faster availability of mitigation code, enabling the device to operate earlier.

The mitigation by the micro functionality fixes described herein may be executed on specific points without changing software functionalities. Performance and/or cybersecurity of the device may be improved, for example, by reducing risk of introducing additional errors to the existing target code by attempting to fix it. Since the mitigation described herein may be provided externally to the original code, the original code is not tampered with.

There may be no dependency in third party performance. Any programmer may provide fixes for the code. OEM may be provided with extra time for dealing with new discovered vulnerabilities by allowing them to block or fix the specific point in a software code without waiting for full image download.

The cycle of creating a new fix for newly discovered vulnerabilities and/or weaknesses may be reduced and improved, since vulnerabilities and/or weaknesses may be fixed point wise as discovered, rather than requiring an update of the entire target code. Cybersecurity and/or performance of the device executing the target code may be improved, since the device may be dynamically updated with newly released fixes while continuing to operate, reducing down time and/or reducing time between when the vulnerabilities and/or weaknesses are discovered and when fixes are available during which the device may be exposed.

Before explaining at least one embodiment in detail, it is to be understood that the systems, methods, apparatus, and/or code instructions described herein are not necessarily limited in its application to the details of construction and the arrangement of the components and/or methods set forth in the following description and/or illustrated in the drawings and/or the Examples. The systems, methods, apparatus, and/or code instructions described herein are capable of other embodiments or of being practiced or carried out in various ways.

Implementations of embodiments may be a system, a method, and/or a computer program product. The computer program product may include a computer readable storage medium (or media) having computer readable program instructions thereon for causing a processor to carry out aspects and/or embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects and/or embodiments described herein.

Aspects and/or embodiments are described herein with reference to flowchart illustrations and/or block diagrams of methods, apparatus (systems), and computer program products according to some embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
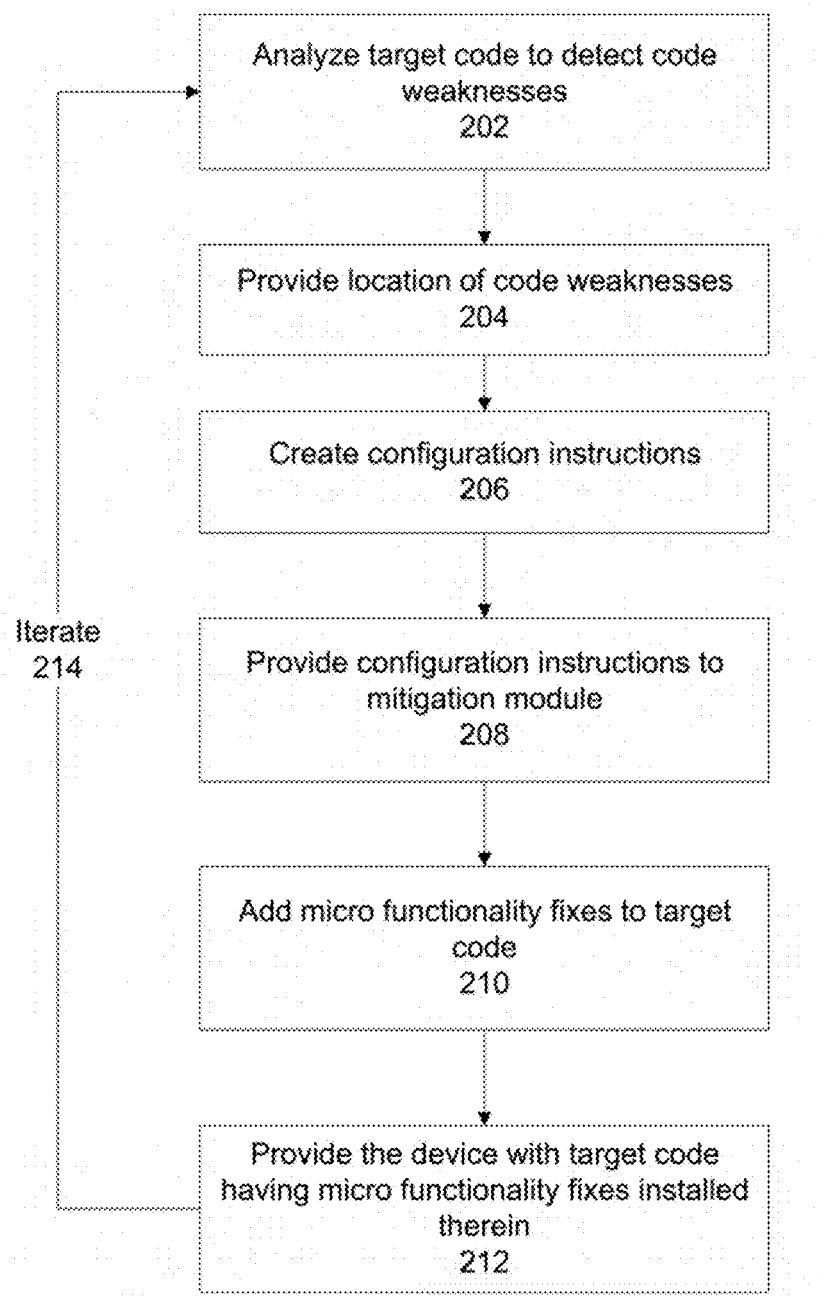
FIG. 2 is a flowchart of a method for creating and installing configuration instructions for installation of micro functionality fixes for mitigation of code weaknesses in a target code, in accordance with some embodiments.
Figure 3:
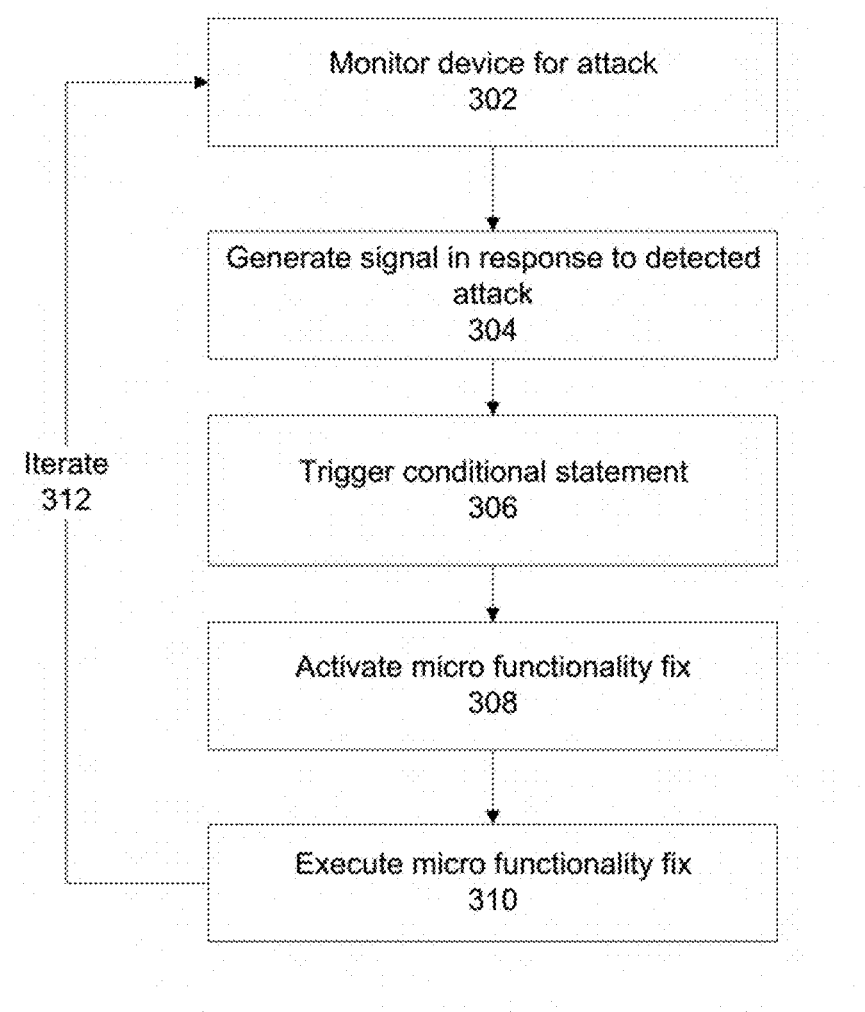
FIG. 3 is a flowchart of a method for mitigating code weaknesses in a target code using add micro functionality fixes, in accordance with some embodiments.

Reference is now made to FIG. 1, which is a block diagram of components of a system 100 for mitigating code weaknesses in a target code 106A by a protected device 104 by adding micro functionality fixes 106D, optionally implemented by using hooks, for execution in run time optionally based on policies 106E implemented for example as conditional statements in exact memory locations in a running memory 106 where the code weaknesses (e.g. CVEs and/or CWEs) are optionally identified by a static analysis tool 152, in accordance with some embodiments. Reference is also made to FIG. 2, which is a flowchart of a method for creating and installing configuration instructions for installation of micro functionality fixes for mitigation of code weaknesses in a target code, optionally implemented by using hooks, for execution in run time optionally based on policies implemented for example as conditional statements in exact memory locations in a running memory where the code weaknesses (e.g. CVEs and/or CWEs) are optionally identified by a static analysis tool, in accordance with some embodiments. Reference is also made to FIG. 3, which is a flowchart of a method for mitigating code weaknesses in a target code using add micro functionality fixes, optionally implemented by using hooks, during execution in run time optionally based on policies implemented for example as conditional statements in exact memory locations in a running memory where the code weaknesses (e.g. CVEs and/or CWEs) are optionally identified by a static analysis tool, in accordance with some embodiments. FIGS. 2 and 3 together depict an exemplary process of mitigating code weaknesses using system 100. System 100 may implement the acts of the method of FIGS. 2-3, for example, by processor(s) executing code (e.g., 126B and/or 106A-E) stored in a memory.

Device 104 may be implemented as for example one or more and/or combination of: a group of connected devices, a network node, a client terminal, a server, a virtual server, a computing cloud, a virtual machine, a desktop computer, a thin client, a network node, a network server, and/or a mobile device (e.g., a Smartphone, a Tablet computer, a laptop computer, a wearable computer, glasses computer, and a watch computer). Device 104 may be installed within a road based vehicle, for example, a car, a truck, a van, a minivan, and a bus, and/or an air-borne vehicle, such as a drone, flying motorcycle, helicopter, and airplane. The vehicle may be an autonomously driven vehicle, a manually driven vehicle, or a semi-autonomous semi-manual driven vehicle.

Device 104 may be implemented, for example, as stand-alone hardware, a plug-in hardware card, a device connected to other devices, and/or as software installed on an existing device. Protected device 104 may be designed to perform one or more functionalities and may include an operating system (OS), one or more applications (e.g. ECU applications) and optionally one or more connectivity components such as a network card or BUS interface (e.g., data interface 116) to allow connecting to a backend server or service (e.g., server 112).

An optional server 112 may be implemented as, for example, network server, web server, a computing cloud, a virtual server, a network node, a virtual machine, a thin client, a cellular telephone, a smart phone, a mobile device, and a component in a vehicle (e.g., ECU). Server 112 may provide backend services and/or a service for device 104.

Server 112 may receive one or more locations of code weakness in the target code 106A and creates configuration instructions 106C such as a configuration file, with one or more micro fix functionalities 106D each designated to be installed, optionally as a software hook, in one of the one or more locations (e.g., of memory 106).

Functions described herein as performed by server 112 may be based on processor(s) 122 of server 112 executing code 126B and/or 106A-E.

Different architectures of system 100 may be implemented, for example:

Device 104 may be in communication with external server 112. Server 112 may provide services to multiple devices 104, for example, computing configuration instructions for multiple devices 104, as described herein. Device 104 may be connected to the server 112 or service, for example for software updates, reporting and/or the like, as described herein. 114

Communication between device 104 and server 112 may be over a network 114, and may be implemented, for example, via an application programming interface (API), software development kit (SDK), functions and/or libraries and/or add-ons added to existing code executing on devices 104, and/or function and/or interface calls to code executed by server 112.

Functions performed by server 112 may be performed by device 104, for example, the code executed by server 112 may be executed by device 104. Device 104 may be implemented as a standalone device.

Hardware processor(s) 102 of device 104 and/or processor(s) 122 of server 112 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 and/or 122 may include a single processor, or multiple processors (homogenous or heterogeneous) arranged for parallel processing, as clusters and/or as one or more multi core processing devices.

Memory 106 of device 104 and/or memory 126 of server 112 stores code instructions executable by respective hardware processor(s) 102 and/or 122, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 and/or 125 stores code that implements one or more features and/or acts of the method described with reference to FIGS. 2-3 when executed by hardware processor(s) 102 and/or 122.

Memory 106 may store one or more of the following code:

Target code 106A, which may be the code for which weaknesses are detected and mitigated.

Mitigation module 106B. Mitigation module 106B may be installed to access target code 106A at device 104 in runtime. The mitigation module receives configuration instructions 106C which include list or a dataset defining one or more memory locations in memory chip 106 hosting target code 106A and micro functionality fixes 106D each defined to be installed on one of the locations.

Configuration instructions 106C for installing micro functionality fixes 106D for example by using software hooks in specific locations.

Micro functionality fixes dataset 106D. Each micro functionality fix 106D may be optionally a fix of, for example, 2-6 (or 1-10, or 3-12, or other ranges) code lines that set a function to be left unexecuted or semi executed so as to avoid performing one of the detected code weaknesses.

Policy dataset 106E. Each micro functionality fix 106D or location may be associated with a respective policy 106D for mitigating a respective code weakness, for instance in response to receiving a signal from IDS 150 or another component and/or device.

Optionally, the hook further includes or associated with a respective policy 106E, for instance conditional statement(s) defining when to apply the respective micro functionality fix 106D.

Static analysis tool 152 for detecting for the target code, one or more code locations of one or more code weaknesses such as CVEs and/or a CWEs.

Intrusion detection system (IDS) 150, or an intrusion detection software component. For brevity, the IDS and the detection software component are referred to herein as an IDS. IDS 150 may be connected to and/or installed on device 104. IDS 150 may monitor device 104 for active attacks, and generate a signal when an active attack is detected.

It is noted that code 106B-106E may be stored in other locations, for example, another memory, data storage device 108, and/or another computing device.

Computing device 104 may include data storage device(s) 108 for storing data. Server 112 may include data storage device(s) 128 for storing data, for example, received locations, and/or generated configuration instructions 106C. Data storage device(s) 108 and/or 128 may be implemented as, for example, a memory, a local hard-drive, virtual storage, a removable storage unit, an optical disk, a storage device, and/or as a remote server and/or computing cloud (e.g., accessed using a network connection).

Network 114 may be implemented as, for example, the internet, a broadcast network, a local area network, a virtual network, a wireless network, a cellular network, a local bus, a point to point link (e.g., wired), a vehicle network, a controller area network (CAN), and/or combinations of the aforementioned. It is noted that network 114 may refer to a direct connection to server 112. For example, the configuration instructions are received via a cable or a dongle implementation of network 114.

Device 104 may include a data interface 116 (e.g., network interface) for connecting to network 114, for example, one or more of, a network interface card, an antenna, a wireless interface to connect to a wireless network, a physical interface for connecting to a cable for network connectivity, a virtual interface implemented in software, network communication software providing higher layers of network connectivity, and/or other implementations.

Device 204 and/or server 112 include and/or are in communication with one or more physical user interfaces 118 that include a mechanism for user interaction, for example, to enter data (e.g., set parameters for analyzing target code) and/or to view data (e.g., history of triggered micro functionality fixes).

Exemplary physical user interfaces 118 include, for example, one or more of, a touchscreen, a display, gesture activation devices, a keyboard, a mouse, and voice activated software using speakers and microphone.

Device 104 may communicate with one or more of the following over network 114:

IDS 150. It is noted that IDS 150 may be implemented as an external device, as code installed on device 104 (e.g., in memory 106 and/or data storage device 108), as code installed on server 112, and/or executed on another computing device and/or server.

Static analysis tool 152. It is noted that static analysis tool 152 may be implemented as an external device, as code installed on device 104 (e.g., in memory 106 and/or data storage device 108), and/or as code installed on server 112, and/or executed on another computing device and/or server.

Other computing devices and/or servers (not shown), for example, to obtain an updated copy of code.

Referring now back to FIG. 2, at 202, the target code may be analyzed by the static analysis tool. The target code may be executed by processor(s) 102 of device 104. The analysis may be triggered, for example, at regular intervals (e.g., once a month), in response to detected events (e.g., high risk of attack, attack on other devices), and/or in response to newly discovered weaknesses and/or newly available micro functionality fixes.

The target code may be any code executed by processor(s) 102, for example, low level code, high level code, kernel code, OS code, application code, a script, binary code, assembler code, and the like. The target code may be stored in the memory chip of the device.

The static analysis tool may be optionally a part of a build system including the target code or an external service tool.

The target code may be a full image, for example, a complete set of code, for example, of an application. Alternatively, the target code may be a portion of a full image. The target code may be executed as part of the full image and not executed independently. For example, a library and/or function and/or object called by the full image.

Optionally, the static analysis tool analyzes the code to detect weaknesses. The weaknesses may be CVEs and/or CWEs, optionally defined based on standards and/or defined dictionary.

Optionally, the static analysis tool detects one or more code locations of the detected code weaknesses such as CVEs and/or a CWEs. The locations may be defined as memory locations, for example, offsets.

At 204, the location(s) of the identified weaknesses and optionally an indication of the identified weaknesses (e.g., code in the dictionary) are provided, for example, to the external server.

At 206, the configuration instructions are created, optionally by the server. The configuration instructions may be created, optionally automatically. For example, known fixes to the identified weaknesses are stored in a dataset.

The configuration instructions may be stored and/or provided as a configuration file, for example, human readable text, a script, binary code, compiled code, and non-compiled code.

The configuration instructions include instruction to install micro functionality fixes, for example by using software hooks, in these specific locations of the identified code weaknesses. Optionally a single micro functionality fix may be installed for each identified code weakness location. Alternatively, multiple micro functionality fixes are installed for a single code weakness location, where each fix may be selectively activated according to the policy. For example, one fix may be activated for a malware attack, and another fix may be activated for a human hacker attack.

The configuration file includes one or more memory locations of one or more code weaknesses optionally obtained from the code analysis tool. Each memory location may represent a memory location of a CVE and/or a CWE in the target code. The configuration instructions further includes for each of the memory locations a micro functionality fix (e.g., a single fix or multiple fixes) or a reference thereto (referred to herein interchangeably), for instance a software hook for enabling the micro functionality fix.

Each micro functionality fix may be optionally provided with a policy such as a conditional statement, so as to be activated to prevent a specific code weakness from being executed, for instance when one or more conditions are met. For example, it fixes a respective code weakness. The conditional statement defines logic to trigger the micro functionality fix in the software hook. For instance, the conditional statement changes a state of the micro functionality fix to an active state from a non active state when a signal from a monitoring system may be identified. The conditional statement may selectively trigger one of multiple fixes.

At 208, the configuration instructions (e.g., file) are provided to the mitigation module (e.g., of the device), for example, transmitted by the server to the device over the network.

The configuration instructions may be encrypted, designed to be read and/or decrypted by the mitigation module. In another example, the server component connects to the protected device and sends the encrypted configuration file to the protected device.

The mitigation module receives configuration instructions such as a file.

The mitigation module may verify authenticity of the received configuration file.

At 210, the micro functionality fixes are added to the target code.

The micro functionality fixes are optionally added to the target code by the mitigation module which may be optionally a low-level software code referred to herein as a low-level software module or a mitigation module.

The mitigation module installs the micro functionality fix(s) in the respective code location(s) of the respective code weakness(s) in the running memory, optionally with conditional statement(s) for applying the micro functionality fix(s) optionally when IDS signal(s) is received, for example as defined in the respective policy(es).

When executed, the mitigation module installs each of the micro functionality fixes in a respective location indicated in the configuration instructions, optionally together with a conditional statement for activation (also referred to as an exemplary policy). The conditional statement may be activated when a signal from the IDS is received, for example as described herein. An executed micro functionality fix may include a small amount (e.g. 1-6 lines) of machine code lines which are added at a code weakness memory location for altering a functionality triggering a code weakness in the code weakness memory location. The activation of the micro functionality fixes, such as software hooks, may be conditioned by an internal and/or an external detection of an active attack on the protected device.

When executed the mitigation module has write and optionally read rights facilitating changing the target code, optionally at running time, for instance in the memory chip hosting the target code.

At 212, the device with target code having micro functionally fixes installed therein is provided. Execution of the micro functionality fixes, optionally in response to a triggered policy, for example, in response to a signal outputted by an IDS when an attack is detected, is described with reference to FIG. 3.

At 214, one or more features 202-212 are iterated.

The iterations may be performed, for example, at regular intervals (e.g., once a month), in response to detected events (e.g., high risk of attack, attack on other devices), and/or in response to newly discovered weaknesses and/or newly available micro functionality fixes.

The iterations may include receiving an update to the static analysis tool for detecting a new code weakness. The target code may be analyzed to identify the new code weakness. New configuration instructions including new micro functionality fix and new code weakness location for the new code weakness are created and provided. The execution of the mitigation module induces a new installment of the new micro functionality fix in the new code weakness location.

Referring now back to FIG. 3, at 302, the device with target code having micro functionally fixes installed therein may be monitored, for example, for an attack. Attacks may be automated attacks by malware, and/or manual attacks by a human entity for malicious intent, for example, to crash the device, to steal data, and/or to gain control of the device.

Optionally, the IDS monitors the device for detecting active attacks on the device. Alternatively or additionally, another device and/or system which may be connected to or include the protected device monitors the device in runtime.

The IDS may be a device or software application that monitors a network or systems for malicious activity or policy violations. Any malicious activity or violation may be typically reported either to an administrator or collected centrally using a security information and event management (SIEM) system. A SIEM system combines outputs from multiple sources, and uses alarm filtering techniques to distinguish malicious activity from false alarms. There may be a wide spectrum of IDS, varying from antivirus software to hierarchical systems that monitor the traffic of an entire backbone network. The most common classifications are network intrusion detection systems (NIDS) and host based intrusion detection systems (HIDS). A system that monitors important operating system files may be an example of a HIDS, while a system that analyzes incoming network traffic may be an example of a NIDS. It may be also possible to classify IDS by detection approach: the most well-known variants are signature-based detection (recognizing bad patterns, such as malware) and anomaly-based detection (detecting deviations from a model of "good" traffic, which often relies on machine learning). Some IDS have the ability to respond to detected intrusions. Systems with response capabilities are typically referred to as an intrusion prevention system.

At 304, a signal and/or other indication may be generated in response to a detected event. Optionally, the signal may be generated by the IDS, optionally in response to a detected active attack. For instance, the IDS provides the signal via a computer network and/or any data interface. The signal may be implemented as, for example, network messages (e.g., packets), analogue signals (e.g., wireless and/or on a cable), and/or digital signals.

The signal may be generated in runtime, when the IDS detects an active attack.

At 306, one or more conditional statements may be triggered in response to the received signal. The conditional statements may be part of a policy associated with identified code weaknesses, for example, global policy affecting all code weakness locations, a local policy affecting some code weakness locations, or a targets policy affecting a single code weakness location.

Optionally, one or more (e.g., each) micro functionality fix may be provided with a policy such as a conditional statement, so as to be activated to prevent a specific code weakness from being executed, for instance when one or more conditions are met. For example, it fixes a respective code weakness, or blocks the code weakness from being executed.

At 308, one or more micro functionality fixes are optionally activated in response to the conditional statement and/or policy.

The conditional statement may define logic to trigger the micro functionality fix in the software hook. For instance, the conditional statement changes a state of the micro functionality fix to an active state from a non active state when the signal from a monitoring system is identified and the conditional statement is met.

At 310, when the target code of the protected device reaches the location of the code weakness, the micro functionality fix may be executed to mitigate the code weakness. Optionally, the micro functionality fix may be executed when activated (e.g., may be in an active state), as described herein.

At 312, features described with reference to acts 302-310 may be iterated, for example, for monitoring of the device for attacks, and mitigation by execution of the micro functionality, optionally in real time and/or continuous monitoring.

Figure 4:
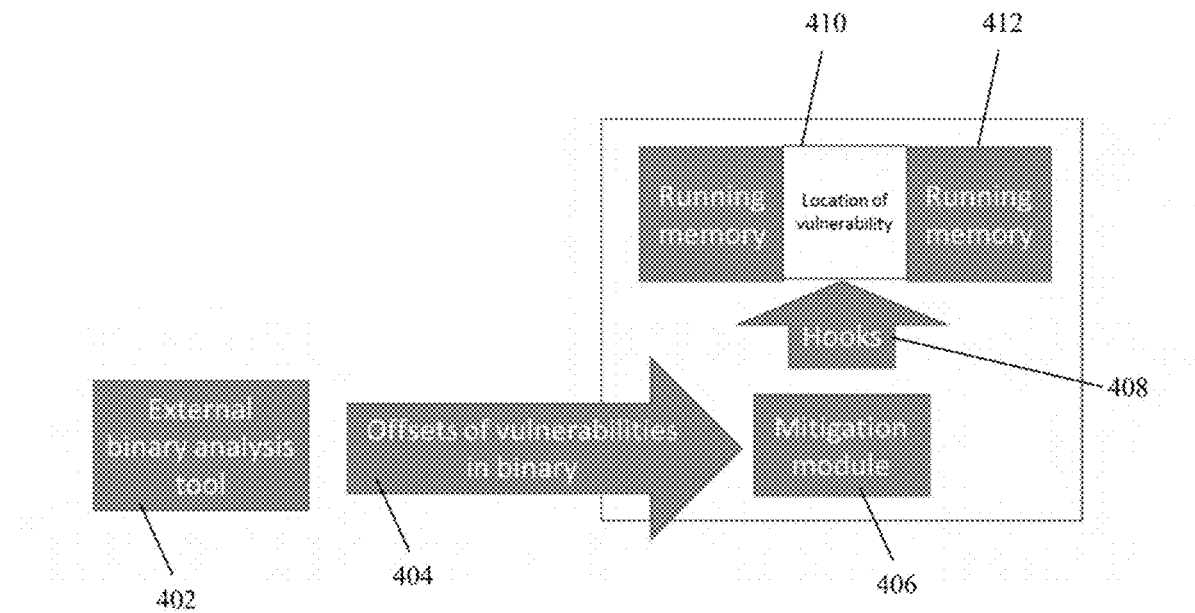
FIG. 4 is a schematic of a high level dataflow for adding micro functionality fixes to a target code for mitigating code weaknesses thereof, in accordance with some embodiments.

Reference is now made to FIG. 4, which is a schematic of a high level dataflow for adding micro functionality fixes to a target code for mitigating code weaknesses thereof, in accordance with some embodiments. The dataflow described with reference to FIG. 4 may be implemented by components of system 100 described with reference to FIG. 1 and/or based on features described with reference to FIGS. 2-3 (e.g., for implementation, substitution, combination, and/or addition of the features). At 402, an external binary analysis tool may be used to analyze the target code to identify code weaknesses. At 404, the offsets of vulnerabilities in binary (i.e., locations) of the identified code weaknesses and micro functionality fixes for the identified code weaknesses are provided to mitigation module 406. Mitigation module 406 installs hooks 408 for the micro functionality fixes in the received location of vulnerability 410 in running memory 412.

Figure 5:
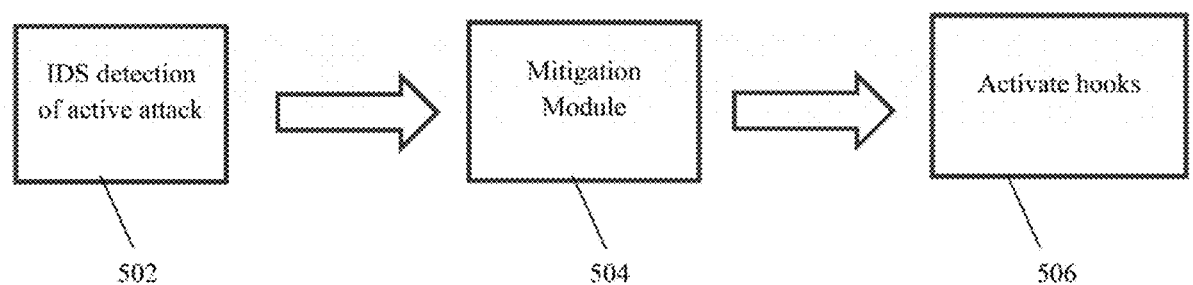
FIG. 5 is a schematic of a high level dataflow for triggering execution of the micro functionality fixes in response to a detected active attack, in accordance with some embodiments.

Reference is now made to FIG. 5, which is a schematic of a high level dataflow for triggering execution of the micro functionality fixes in response to a detected active attack, in accordance with some embodiments. The dataflow described with reference to FIG. 5 may be implemented by components of system 100 described with reference to FIG. 1 and/or based on features described with reference to FIGS. 2-3 (e.g., for implementation, substitution, combination, and/or addition of the features). At 502, an IDS detects an active attack on the device. The IDS may output a signal indicative of the detected attack. At 504, the mitigation module receives the signal, and activates hooks 506 in the target code. The active hooks trigger execution of the micro functionality fixes at respective locations in the target code corresponding to identified code weaknesses.

Various embodiments and aspects of some exemplary implementations of the systems, methods, apparatus, and/or code instructions described herein and as claimed in the claims section below find support in the following prophetic examples

Examples

Reference is now made to the following examples, which together with the above descriptions illustrate some implementations of the systems, methods, apparatus, and/or code instructions described herein in a non-limiting fashion.

An exemplary code weakness which may be mitigated by at least some implementations of the systems, methods, apparatus, and/or code instructions described herein may be a buffer overflow vulnerability, which may be a vulnerability discovered in an application programming interface (API) which lets an attacker to execute a remote code execution by using a buffer overflow vulnerability in the API. The micro functionality fix for mitigating this vulnerability may be designed to perform a boundary check to the API, not allowing the buffer to exceed a predefine length. In use, the code analysis tool (e.g., 202 of FIG. 2) detects a lack of boundary check at an exact location in the memory of the target code, for example detects a location of a copy function which does not check a length of a buffer before it copies data (e.g., 204 of FIG. 2). Configuration instructions (e.g., 206 of FIG. 2) with the specific location of the copy function may be sent to the mitigation module, together with the micro functionality fix and execution policy (e.g., 208 of FIG. 2).

Upon boot the mitigation module installs a hook code (e.g., 210 of FIG. 2) that includes the micro functionality fix in the specific location of the copy function together with constraint statement (e.g., 306 of FIG. 3), such as a constraint statement changing a status of the micro functionality fix when a signal is detected. In runtime code (e.g., 212 of FIG. 2) the micro functionality fix may be executed to fix the boundary check when the constraint statement is met, for instance when an activation IDS signal is detected. When the IDS detects a possible attack code (e.g., 302 of FIG. 3), it sends a signal (e.g., 304 of FIG. 3) and the mitigation module catches the signal to change the state of the hook to active (e.g., 308 of FIG. 3). This allows executing the micro functionality fix (e.g., 310 of FIG. 3) for mitigating the attack.

Another exemplary code weakness which may be mitigated by the above methods and systems may be a zero day privilege escalation vulnerability. This vulnerability occurs when an OS system call allows an application to gain root privilege in the system.

In use, the code analysis tool (e.g., 202 of FIG. 2) detects a memory location (e.g., 204 of FIG. 2) of a system call usage in the application, and sends this memory location together with execution policy such as blocking upon receiving an IDS signal, to the mitigation module (e.g., 208 of FIG. 2). Blocking can be simply performed by few lines of code causing a respective function to immediately return before it reaches a vulnerability point.

Upon boot the mitigation module installs a hook with the micro functionality fix in the specific location of the system call (e.g., 210 of FIG. 2) and a conditional statement (e.g., 306 of FIG. 3) calling for the system call depends on receipt of an IDS signal. In case the IDS detects an active attack (e.g., 302, 304 of FIG. 3), the mitigation module changes the respective state to active (e.g. hook state) (e.g., 308 of FIG. 3), blocking the application from calling the system call (e.g., 310 of FIG. 3).

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant code weaknesses will be developed and the scope of the term code weakness is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although the systems, methods, apparatus, and/or code instructions have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the systems, methods, apparatus, and/or code instructions described herein. To the extent that section headings are used, they should not be construed as necessarily limiting. In addition, any priority document(s) of this application is/are hereby incorporated herein by reference in its/their entirety.

What is claimed is:

1. A method of mitigating code weaknesses in a target code by adding micro functionality fixes, comprising:
at least one server external to a device, executing a code for:
identifying, automatically by a static analysis tool, a plurality of code weaknesses in a target code installed in a memory chip of the device; and
sending configuration instructions to a mitigation module installed on the memory chip, the configuration instructions comprising:
a plurality of micro functionality fixes, and a plurality of code weakness locations each associated with one of the plurality of code weaknesses and one of the plurality of micro functionality fixes;
wherein an execution of the mitigation module by at least one processor of the device induces an installation of the plurality of micro functionality fixes in the plurality of code weakness locations; and
wherein said method further comprises receiving an update to the static analysis tool for detecting at least one new code weakness, and iterating the identifying to detect the at least one new code weakness, and the sending configuration instructions comprises at least one new micro functionality fix and at least one new code weakness location for associated at least one new code weakness, wherein the execution of the mitigation module induces another installation of the at least one new micro functionality fix in the at least one new code weakness location.

2. The method claim 1, wherein the plurality of code weaknesses are selected from a group consisting of common vulnerability exposures (CVEs) and common weakness enumerations (CWEs).

3. The method of claim 1, wherein the target code is a portion of a full image, wherein the target code is executed as part of the full image and not executed independently.

4. The method of claim 1, wherein the configuration instructions comprise a plurality of policies each comprising at least one code statement for activating one of the plurality of micro functionality fixes; wherein the execution of the mitigation module by the at least one processor of the device induces an installation of the plurality of policies in the target code.

5. The method of claim 4, wherein the at least one code statement is a conditional statement reactive to a signal received from an intrusion detection system (IDS).

6. The method of claim 5, wherein the conditional statement changes a state of one of the plurality of micro functionality fixes to an active state from a non active state when the signal from the IDS is received.

7. The method of claim 5, wherein the IDS generates the signal in response to a detected active attack on the device.

8. The method of claim 4, wherein two or more micro functionality fixes are installed for a single code weakness location, and a policy defines conditions for selectively activation each one of the two or more micro functionality fixes.

9. The method of claim 1, wherein the plurality of micro functionality fixes are installed as software hooks in the plurality of code weakness locations.

10. The method of claim 1, wherein each micro functionality fix is 2-6 code lines.

11. The method of claim 1, wherein each micro functionality fix sets a function to be left unexecuted or semi executed so as to avoid performing one of the detected code weaknesses.

12. The method of claim 1, wherein the execution of the mitigation module induces the installation of the plurality of micro functionality fixes in the plurality of code weakness locations in a running memory of the memory chip.

13. The method of claim 1, wherein the device is a component installed in a vehicle.

14. A system of mitigating code weaknesses in a target code by adding micro functionality fixes, comprising:
a mitigation module installed a memory chip of a device;
at least one server external to the device for detecting an active attack on the device and in response to the detected active attack, identifying a plurality of code weaknesses in a target code installed in a memory chip of the device and sending configuration instructions to the mitigation module, the configuration instructions comprising:
a plurality of micro functionality fixes, and
a plurality of code weakness locations each associated with one of the plurality of code weaknesses and one of the plurality of micro functionality fixes;
wherein an execution of the mitigation module by at least one processor of the device induces an installation of the plurality of micro functionality fixes in the plurality of code weakness locations as a protection against the detected active attack; and
wherein the plurality of micro functionality fixes is selectively activated and executed in response to an identification of a predefined condition; and
wherein said method further comprises receiving an update to a static analysis tool for detecting at least one new code weakness, and iterating the identifying of the plurality of code weaknesses to detect the at least one new code weakness, and the sending configuration instructions comprises at least one new micro functionality fix and at least one new code weakness location for associated at least one new code weakness, wherein the execution of the mitigation module induces another installation of the at least one new micro functionality fix in the at least one new code weakness location.

15. A computer program product for mitigating code weaknesses in a target code by adding micro functionality fixes, comprising:
- a non-transitory memory storing thereon code of the computer program product for execution by at least one hardware process, the code including instructions for:
    - detecting an active attack on a device;
    - in response to the detected active attack, identifying a plurality of code weaknesses in a target code installed in a memory chip of the device; and
    - sending configuration instructions to a mitigation module installed on the memory chip, the configuration instructions comprising:
        - a plurality of micro functionality fixes, and a plurality of code weakness locations each associated with one of the plurality of code weaknesses and one of the plurality of micro functionality fixes;
    - wherein an execution of the mitigation module by at least one processor of the device induces an installation of the plurality of micro functionality fixes in the plurality of code weakness locations as a protection against the detected active attack; and
- wherein the plurality of micro functionality fixes is implemented as statements in exact memory locations in a running memory where the plurality of code weaknesses are identified; and
- wherein said method further comprises receiving an update to a static analysis tool for detecting at least one new code weakness, and iterating the identifying of the plurality of code weaknesses to detect the at least one new code weakness, and the sending configuration instructions comprises at least one new micro functionality fix and at least one new code weakness location for associated at least one new code weakness, wherein the execution of the mitigation module induces another installation of the at least one new micro functionality fix in the at least one new code weakness location.

* * * * *